United States Patent
Franklin

(10) Patent No.: US 8,464,744 B1
(45) Date of Patent: Jun. 18, 2013

(54) WATER SENSOR WITH ACTIVATION MECHANISM

(71) Applicant: Robert C. Franklin, Los Gatos, CA (US)

(72) Inventor: Robert C. Franklin, Los Gatos, CA (US)

( * ) Notice: Subject to any disclaimer, the term of this patent is extended or adjusted under 35 U.S.C. 154(b) by 0 days.

(21) Appl. No.: 13/694,320

(22) Filed: Nov. 19, 2012

(51) Int. Cl.
*F16K 17/40* (2006.01)

(52) U.S. Cl.
USPC ........... 137/68.11; 137/312; 137/559; 251/66

(58) Field of Classification Search
USPC ................. 137/68.11, 67, 312, 559; 251/294, 251/66; 73/40.5 R
See application file for complete search history.

(56) References Cited

U.S. PATENT DOCUMENTS

| | | | | | |
|---|---|---|---|---|---|
| 5,713,387 | A | * | 2/1998 | Armenia et al. | 137/312 |
| 5,806,559 | A | * | 9/1998 | Takasaka | 137/556 |
| 6,112,764 | A | * | 9/2000 | Engdahl et al. | 137/554 |
| 6,792,967 | B1 | | 9/2004 | Franklin | |
| 7,082,959 | B1 | | 8/2006 | Franklin | |
| 7,424,896 | B1 | * | 9/2008 | Martin et al. | 137/312 |
| 7,562,673 | B1 | * | 7/2009 | Martin et al. | 137/312 |
| 7,703,740 | B1 | | 4/2010 | Franklin | |
| 8,006,714 | B1 | * | 8/2011 | Martin et al. | 137/312 |
| 8,061,380 | B1 | * | 11/2011 | Martin et al. | 137/312 |

* cited by examiner

*Primary Examiner* — John Rivell
*Assistant Examiner* — Daniel Edelbrock
(74) *Attorney, Agent, or Firm* — Robert Charles Hill

(57) ABSTRACT

A water sensor and activation assembly including a paper element to sense the presence of water leaks from appliances such as clothes washing machines, refrigerator ice makers and the like, and to cause an associated water shutoff valve to turn off the source of water leakage. The water sensor, in conjunction with the shutoff valve, operates without any electrical power requirement. The design allows the water sensor to operate in a high humidity environment.

8 Claims, 6 Drawing Sheets

Equation 1: Solving for F2: F2=F1/2 × cos(90°-Θ)

Equation 2: Solving for F3: F3=F2 × cosØ)

OR: F3={F1/2 × cos(90°-Θ)} × cosØ

WATER SENSOR WITH ACTIVATION MECHANISM

FIELD OF INVENTION

This invention relates to a water sensor that, when coupled with an appropriate water shutoff valve, forms a reliable safety shutoff system to protect against property damage due to water leaks. The function of the water sensor is to detect the presence of water leaking from an appliance such as a toilet tank, clothes washing machine, refrigerator ice maker, or the like, and to activate a shutoff valve. Because such water leaks often result in great property damage, it is of the utmost importance to have a leak detection system that is reliable and requires little maintenance. Most existing water sensors in the above applications utilize electronics to accomplish the water detection and activation. This sensor design, in conjunction with my previously patented shutoff valve, accomplishes the design goal without requiring electrical power.

DESCRIPTION OF PRIOR ART

Numerous patents have been issued dealing with water detectors that function over a wide variety of applications, such as life preserver activators and leak detection and water shutoff devices. The water sensor and activation mechanism to be described in this invention was developed as an improvement to the leak detector and shutoff valve systems of my previous Franklin patents, U.S. Pat. No. 6,792,967 and U.S. Pat. No. 7,082,959. These two patents describe water shutoff valve systems in which a water sensor, when exposed to water, releases a spring loaded mechanism that shuts off water flow through an associated water valve. The primary objective of these inventions was to provide a leak detection and shutoff system that did not require electrical power to operate, thus avoiding the associated complication and cost of such devices.

During the development process of the above two patented devices it was always the goal to explore other water sensors that would be improvements to the existing design. The Franklin patents described the use of sugar, salt, or other such substances that would dissolve when exposed to water. One design consideration that has been of concern when using any of the above water soluble elements has been the accumulation of moisture over a long period of time. It can be especially problematic in high humidity environments. Water soluble elements such as sugar or salt will tend to absorb moisture and change their physical structure, often by taking on a hardened crystalline form that requires long periods of time to dissolve when exposed to water. With this in mind, the development of a paper based system was explored. The paper used in the above applications has the property of losing its physical strength by yielding to a tension force when exposed to water.

SUMMARY OF INVENTION

The development of a satisfactory and reliable paper based water sensor to be used in conjunction with the above mentioned Franklin patents required a device that would fulfill at least two basic design requirements. First, the paper element, when subjected to spring tension, must not yield appreciably when placed in a high humidity environment, on the order of ninety-five percent relative humidity. Second, the springs used to exert pressure on the paper element must be of sufficient strength to overcome any static or dynamic friction exhibited by the cable and cable housing used to couple the water sensor to the shutoff valve. In addition, the spring force must be adequate to activate the trigger mechanism located in the shutoff valve.

The development process revealed that the spring force necessary to overcome the typical cable friction and trigger mechanism requirements, when applied to the water absorbent paper element, causes the paper element to elongate and often yield to the point of failure when subjected to high humidity conditions. Therefore, it became necessary to revise the design in a manner that would reduce the force on the paper element to an acceptable level, and yet retain the spring force necessary to overcome the friction forces and to activate the shutoff valve.

It was determined that the best way to accomplish the design requirements and still retain a simple yet reliable design was to split the spring force vectors necessary to, first, place tension on the paper element and, second, to activate the shutoff valve. It will be shown in the following description how that was accomplished.

SUMMARY OF INVENTION

The present invention utilizes two springs to exert force against a common bar structure hereinafter referred to as the force bar. Two other structures are integral parts of the force bar and extend in opposite directions from the midpoint of the force bar. One of these structures contains an inset pocket to accommodate the terminating clamp end of the activating cable that attaches to the water shutoff valve. The other structure extends in the opposite direction and has a wedge shaped end that fits into the matching wedge shape ends of two half sections of the sensor holder assembly. The two half section sensor holder elements are held together by multiple turns of a paper strip that is wrapped tightly around the sensor holders. The paper strip is typically one quarter inch wide with the external terminal end fastened with adhesive to keep the paper strip from unraveling. The opposite ends of the two sensor holder elements are likewise shaped to form a wedge configuration and mate with the corresponding angle of another pointed element that forms part of the water sensor body. It will be seen that this configuration allows the force of the two springs to act in a manner that not only exerts an axial force against the sensor holder elements but also applies a right angle, lateral force that attempts to pry the two sensor holder elements apart. The amount of exerted lateral force is a function of the wedge angle. The overall wedge angle determined to be optimum in this application is about one hundred twenty degrees, however it should be understood that other angles may provide satisfactory operation. From an intuitive standpoint, it can be seen that if the wedge angles were increased to nearly one hundred eighty degrees, there would be very little lateral force attempting to pry the two sensor holder half sections apart. Most of the force would be axial in direction. On the other hand, if the wedge angles were decreased to say, twenty degrees, the dominant force would be trying to pry the sensor holder half sections apart. Thus it can be seen that the outward force that tries to separate the sensor holders can be adjusted by varying the wedge angle, yet still retaining the primary spring force necessary to activate the shutoff valve via the interconnecting cable when the paper element yields and disintegrates under exposure to water. Calculations indicate that the use of a one hundred twenty degree wedge angle results in only about forty percent of the primary spring force being applied toward separation of the sensor holder halves. This reduced force allows the paper element to remain intact in a high relative humidity environment, yet disintegrate when directly exposed to water.

DETAILED DESCRIPTION

Figure 1:
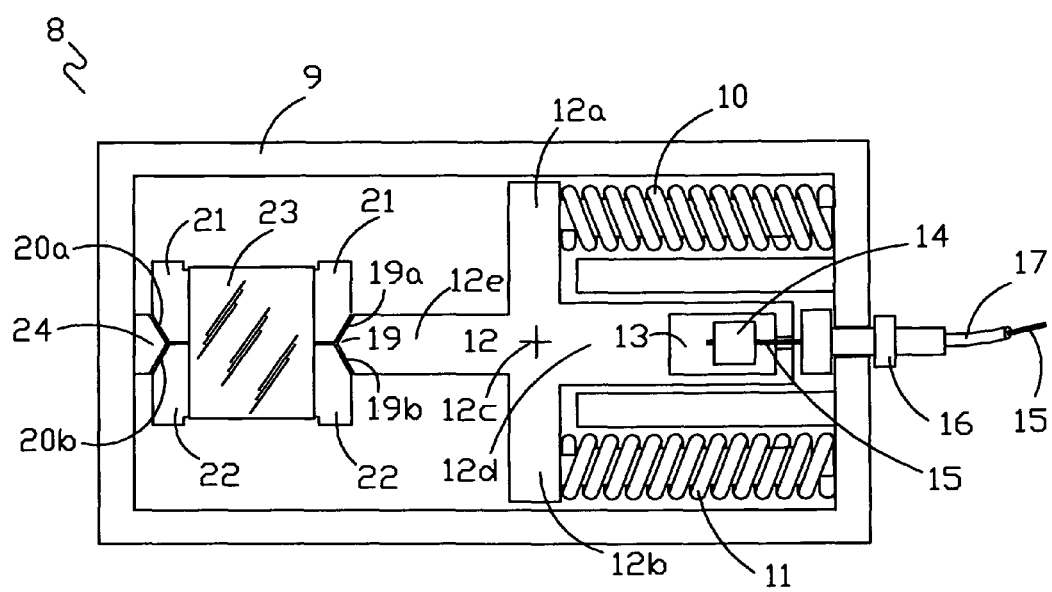
FIG. 1 shows a bottom view of the water sensor assembly of the present invention with the bottom cover removed to display the inner structures of the sensor prior to being exposed to water.

FIG. 1 shows the bottom view of the water sensor assembly of the present invention, generally indicated 8, with the bottom cover removed to expose the internal structures of the water sensor and activation mechanism. Outer enclosure 9 of the water sensor body serves to house both the water absorbing material and the spring mechanism. Springs 10 and 11 are shown in compression and exert pressure at points 12$a$ and 12$b$ of the force bar 12. The selected dimensions and material composition of springs 10 and 11 were largely empirically determined. The spring material used is typically stainless steel because of the moist environment where the water sensor assembly 8 might be located, thereby reducing, the possibility of rust. The springs 10 and 11 are compressed during assembly of the water sensor assembly 8 to a length that produces the desired force yet does not exceed the maximum deflection allowed by the manufacturer's specifications. The force bar 12 has two structures extending to the right, and left from its midpoint 12$c$. The right hand structure 12$d$ includes a section of force bar 12 that contains an inset pocket 13 used to contain a terminating clamp 14 that is fastened to cable 15. Cable 15 exits the sensor assembly via cable adapter 16. The cable 15 is housed in a tubular encasement 17. The cable 15 and tubular so encasement 17 are used as connecting means between the water sensor assembly 8 and the water shutoff valve to be described later.

The left hand structure 12$e$ of the force bar 12 has a tip 19 that is wedge shaped to make direct contact with surfaces 19$a$ and 19$b$ of the sensor holders 21 and 22 respectively. The wedge shaped surfaces 20$a$ and 20$b$ on the left end of the sensor holder sections 21 and 22 make contact with the mating, pointed surfaces of pressure point 24 that is an integral part of the outer enclosure 9. Multiple layers of paper 23 are tightly wrapped around the two sensor holder sections 21 and 22. The external, terminal end of the paper 23 is glued in place to prevent the paper layers from unraveling as will be explained later.

From the above description it can be seen that the force exerted by springs 10 and 11 on the force bar 12, and hence on the force bar extension 12$e$, will attempt to separate the two sensor holders 21 and 22. The paper 2.3 restrains the lateral movement of the two sensor holders 21 and 22. It should also be noted that the wedge angle formed on both the left and right hand surfaces 19$a$, 19$b$, 20$a$ and 20$b$ of the sensor holders 21 and 22 acts to determine the percentage of total force exerted by springs 10 and 11 that will actually try to force the sensor holders 21 and 22 apart. In this manner, by changing the wedge angle, one can control the tension force exerted on the paper 23, with a larger wedge angle resulting in a reduced, lateral separating force.

Figure 2A:
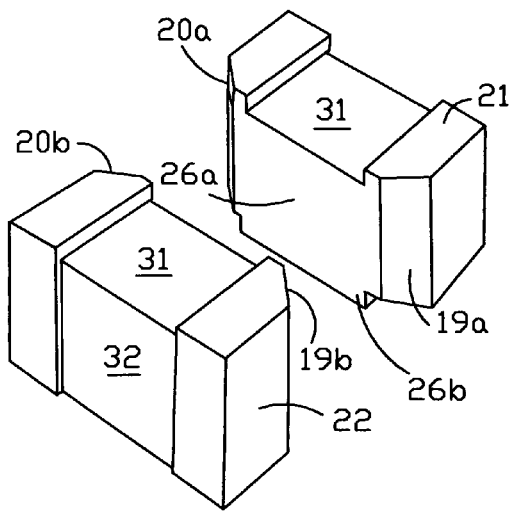
FIG. 2A shows an enlarged perspective view of the sensor holders of the present invention prior to being moved together in position for installation of the paper used as a water sensor material.

FIG. 2A is an enlarged view of the sensor holders 21 and 22 separated from each other to show their relative position and shape before being moved together in position for installation of the water sensor paper to be shown later as item 23. It should be noted that both sensor holders 21 and 22 are identical in shape and size. This not only facilitates assembly but reduces parts cost.

Figure 2B:
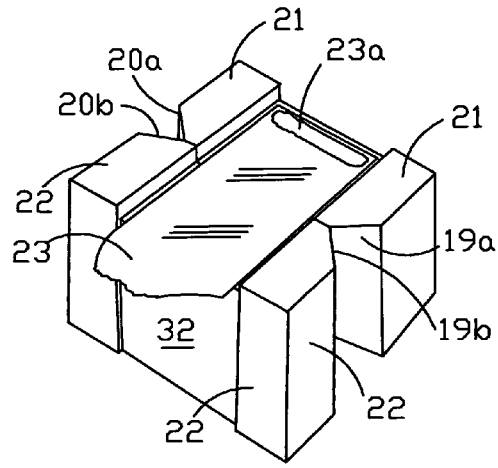
FIG. 2B shows an enlarged perspective view of the sensor holders of the present invention to aid in explaining the method of attaching and wrapping the beginning end of the paper sensor material.

FIG. 2B is an enlarged view of the separate sensor holders 21 and 22 to better display how the paper 23, used as a water sensor, is wrapped around and fastened to the sensor holders 21 and 22. An appropriate adhesive material such as commercially available instant glue is applied at the start end 23$a$ of the water sensor paper 23 to prevent the paper from slipping during the wrapping procedure.

Figure 2C:
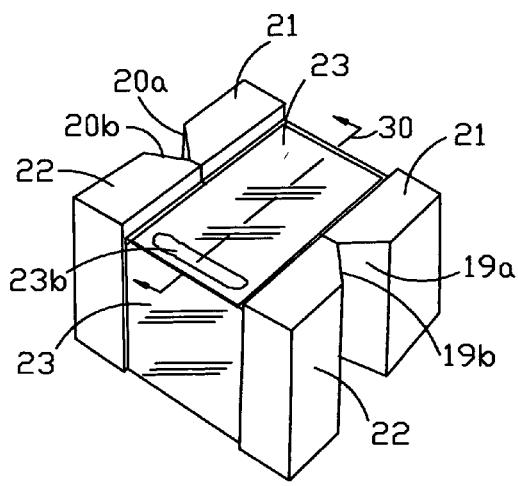
FIG. 2C shows an enlarged perspective view of the sensor holders of the present invention to aid in explaining the method of wrapping and attaching the terminating end of the paper sensor material.

FIG. 2C is a duplication of FIG. 2B to show how the water sensor paper 23 is wrapped around the sensor holders 21 and 22 and fastened by gluing at location 23$b$, thereby preventing the paper from unraveling. The number of layers of sensor paper 23 wrapped around the sensor holders 21 and 22 is arbitrarily determined, and dependent upon the type of paper used and the desired time between exposure to water and sufficient disintegration of the paper material to cause triggering of the associated water shutoff valve to be described later. The type of paper used during the development of water sensor assembly 8 was standard twenty-four pound inkjet copier paper. Three layers of the copier paper provided an acceptable trigger time of between five and fifteen, seconds when, exposed to water.

Figure 2D:
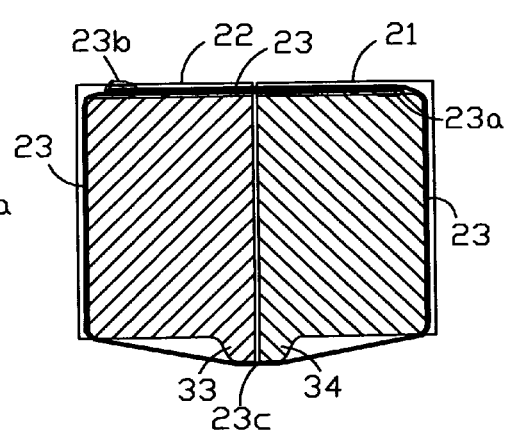
FIG. 2D shows an enlarged cross sectional drawing of the two sensor holders of the present invention to display how the paper sensor material is wrapped around the two water sensor holders and fastened thereon.

FIG. 2D shows an enlarged cross sectional view of the two sensor holders 21 and 22 as viewed relative to the sectional line 30 shown in FIG. 2C. It can be seen in FIG. 2A, FIG. 2B, and FIG. 2C that the sensor paper 23 is wrapped in horizontal guide area 31 and vertical guide area 32 and around the perimeter of sensor holders 21 and 22 to hold them together. The protruding areas 33 and 34 at the bottom of the sensor holders extends the position of the sensor paper at point 23c. As will be seen later, when the sensor holders are installed in the water sensor assembly 8, this provision allows the sensor paper at point 23c to be located in closer proximity to the floor surface where any leaking water will accumulate. To simplify the drawing, only one layer of paper 23 is shown wrapped around the perimeter of the sensor holders 21 and 22. It should be understood that additional layers of paper 23 could be used. Point 23a represents the location for the initial gluing of the sensor paper 23 and point 23b represents the terminating glue point as previously described.

FIG. 3 again shows the bottom view of the water sensor assembly 8 with the bottom cover removed, but now displaying the condition in which water has caused the paper element 23 to partially disintegrate, thereby allowing the sensor holders 21 and 22 to separate. This permits the pointed end 19 of force bar extension 12e to move in a leftward direction due to the force of springs 10 and 11. This leftward movement of force bar 12 also causes the terminating clamp 14, and hence the cable 15, to be pulled in tension to the left in such a manner as to activate the shutoff mechanism of the associated water valve to be explained later.

Figure 3:
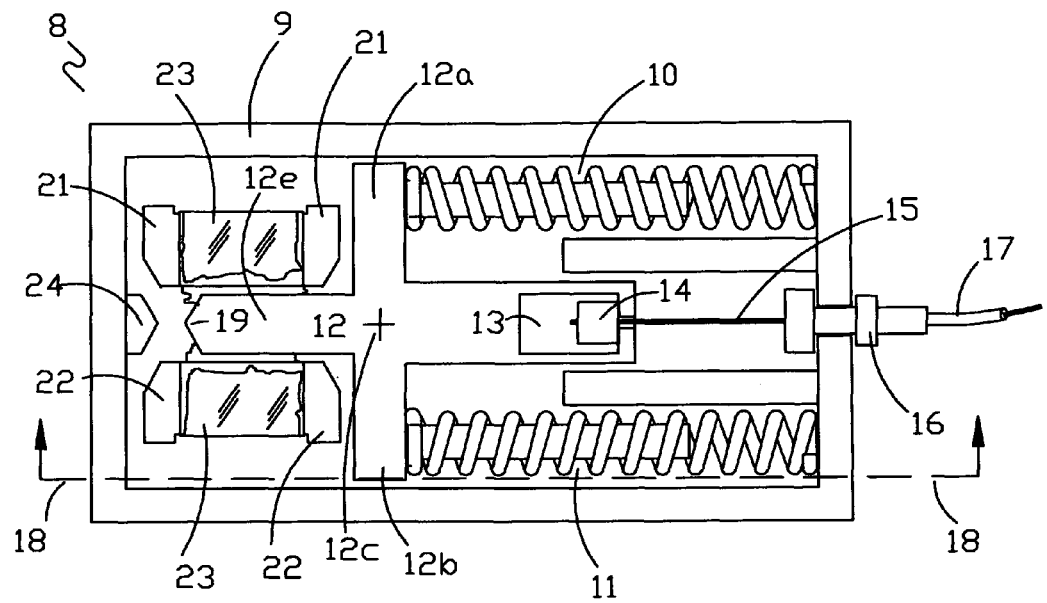
FIG. 3 shows a bottom view of the water sensor assembly of the present invention with the bottom cover removed to display the inner structures of the sensor after the assembly has been exposed to water.
Figure 4:
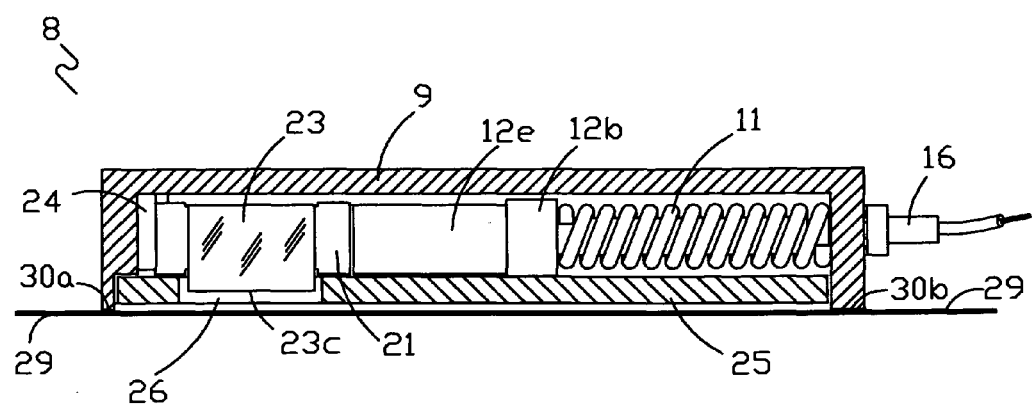
FIG. 4 shows a cross-sectional side view of the water sensor assembly of the present invention.

FIG. 4 is a cross-sectional view of the water sensor assembly 8 as viewed upward from the sectioning line 18 of FIG. 3, and displays the orientation of the spring 11 and other internal structures relative to the outer enclosure 9 and the bottom cover 25. In the condition shown, the paper element 23 has not been exposed to water. The bottom edges of the sensor holders 21 and 22 are shaped in such a manner as to allow the water sensing surface 23c of paper element 23 to protrude slightly into the opening 26 of bottom cover 25 as previously described in FIG. 2D. This arrangement allows the water sensing surface 23c to be in closer proximity to the floor surface 29. The protrusions 30a and 30b of the outer enclosure 9 provide spacing between the bottom cover 25 and the floor surface 29, thereby facilitating water flow toward the paper element 23. If desired, the vertical thickness of the force bar 12e can be approximately the same as the vertical dimension of the sensor holders 21 and 22, thereby optimally distributing the force exerted by the force bar 12e upon the sensor holder surfaces 19a and 19b as shown in FIG. 1.

Figure 5A:
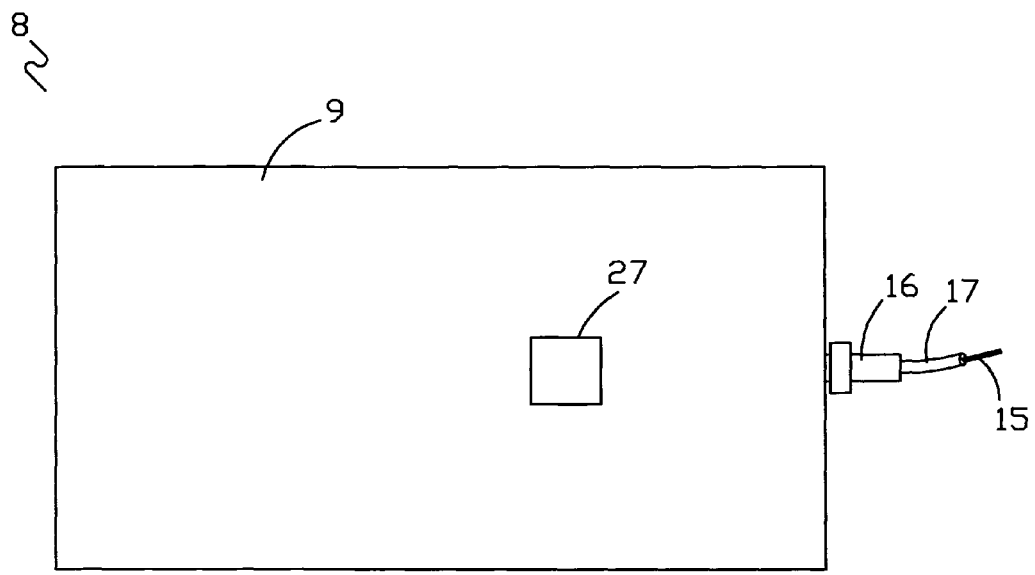
FIG. 5A shows a top view of the water sensor assembly of the present invention to display the window used to indicate if the water sensor assembly has been activated.

FIG. 5A is the top view of the generally indicated water sensor assembly 8. A viewing port 27 in the outer enclosure 9 provides a means of determining if the water sensor has been activated. For example, in the normal, standby condition, the color exposed through the viewing port 27 would be green colored. If the water sensor assembly 8 was exposed to water and the water sensor paper 23 disintegrated sufficiently to trigger the associated water shutoff valve to a closed condition, the color displayed in viewing port 27 would change to red, for example. Since the water sensor assembly 8 is often positioned in locations that are visible, but not readily accessible, the ability to easily view the status of the water sensor assembly 8 is important.

Figure 5B:
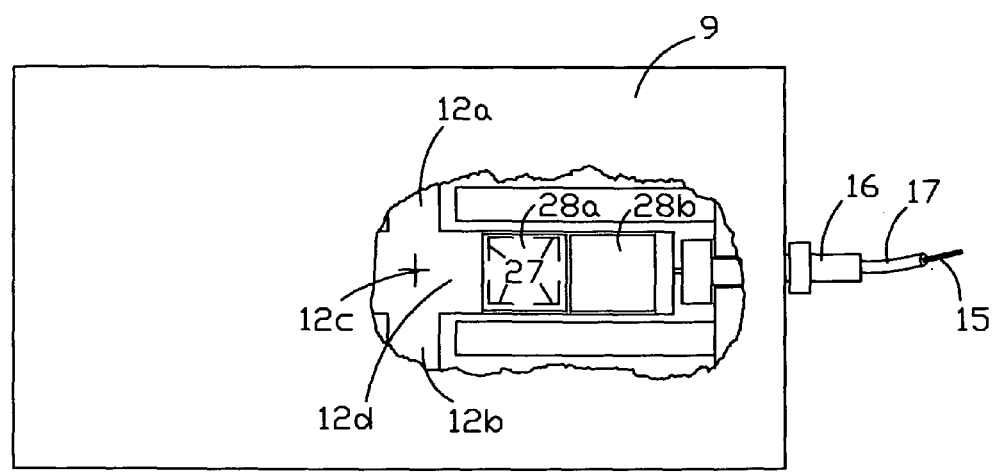
FIG. 5B shows a cutaway view of the top view of the water sensor assembly of the present invention to facilitate explaining the location of the indicating means used to indicate if the water sensor assembly has been activated.

FIG. 5B again shows the top view of water sensor assembly 8, but now provides a cutaway view of the underside area 12d of the previously described force bar 12. The underside of the right structure 12d of force bar 12 of FIG. 1, contains two colored surface sections 28a and 28b. In the normal, non-activated condition of the water sensor a green color 28a, for example, would be visible through the viewing port 27. Again for example, when the water sensor assembly 8 has been exposed to water and the paper element 23 has partially or totally disintegrated, allowing the force bar 12 to move to the left, a red color 28b would be visible through the viewing port 27 shown overlaid on 28a.

In the event a water leak is detected and the water sensor assembly 8 activates the water shutoff valve, there must be a provision to reset the system once the source of the water leak has been repaired and any resulting water has been removed. In such an event, there are two obvious solutions, the first being to simply remove and replace the entire water sensor assembly 8 by disconnecting it from the cable attachment. The second solution is to provide a design in which the sensor holder half sections 21 and 22, along with the paper 23 form a replaceable assembly (not shown).

Figure 6A:
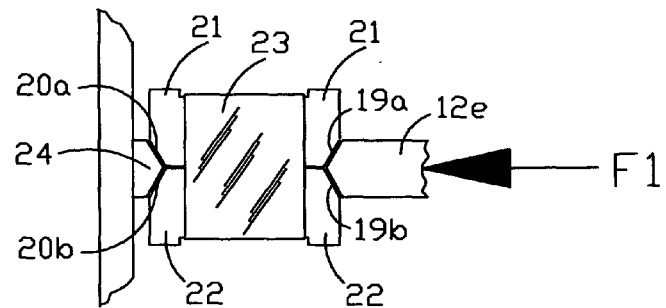
FIG. 6A shows a portion of FIG. 1 pertaining to the sensor holder and the associated force exerted on same.

FIG. 6A shows a portion of FIG. 1 that includes the sensor holder sections 21 and 22, and an associated force vector F1. Force vector F1 exerts a force leftward against the wedged shaped surface of the sensor holder sections 21 and 22, and results from the total force exerted by the springs 10 and 11 shown in FIG. 1.

Figure 6B:
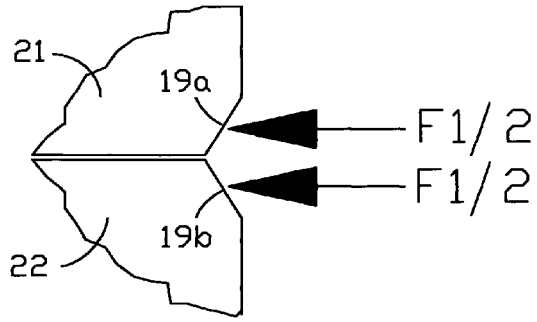
FIG. 6B shows a section of FIG. 6A for the purpose of describing the independent forces exerted on each half of the sensor holder.

FIG. 6B further enlarges the wedged shaped surfaces 19a and 19b of the sensor holder sections 21 and 22 respectively to demonstrate that the force vector F1, shown in FIG. 6A, can actually be divide into two separate vectors, each with a magnitude of one-half of the force of force vector F1. The purpose in doing this is to facilitate calculating the lateral force exerted against the surface 19b. Once that, is determined, then the total lateral force attempting to separate the two halves of the sensor holder sections 21 and 22 is simply twice the calculated value.

Figure 6C:
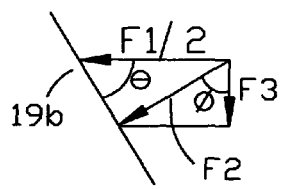
FIG. 6C shows a set of force vectors applied to the surface of the sensor holder of the present invention for the purpose of describing the forces and associated equations used to determine the effect of the sensor holder surface angle on the lateral force exerted on same.

Next, FIG. 6C shows the isolated surface 19b of the lower sensor holder section 22. The first calculation functions to determine what portion, of force vector F1/2 is perpendicular to surface 19b, namely, what is the value of F2. This is accomplished via Equation 1 of FIG. 6C. Next, using Equation 2, one can determine the value of force vector F3, which will represent one half of the total lateral force exerted by force vector F1, and which is attempting to force the two sensor holder sections apart.

As an example, using a total wedge angle between the two sensor holder sections 21 and 22 of 90 degrees, that is a 45 degree surface angle θ, the effective lateral force exerted to separate the two sensor holders would be one half, or fifty percent of the force vector F1. As another example, using a total wedge angle of 120 degrees, that is a 60 degree angle θ, the effective lateral separation force vector F1 would be approximately 0.43, or 43 percent of the force vector F1. Although the effect, of changing the wedge angle should be intuitive, these calculations will mathematically substantiate the results. In actual testing it was found that a wedge angle of 120 degrees proved satisfactory, however it should be understood that other angles may also function satisfactorily.

Figure 7:
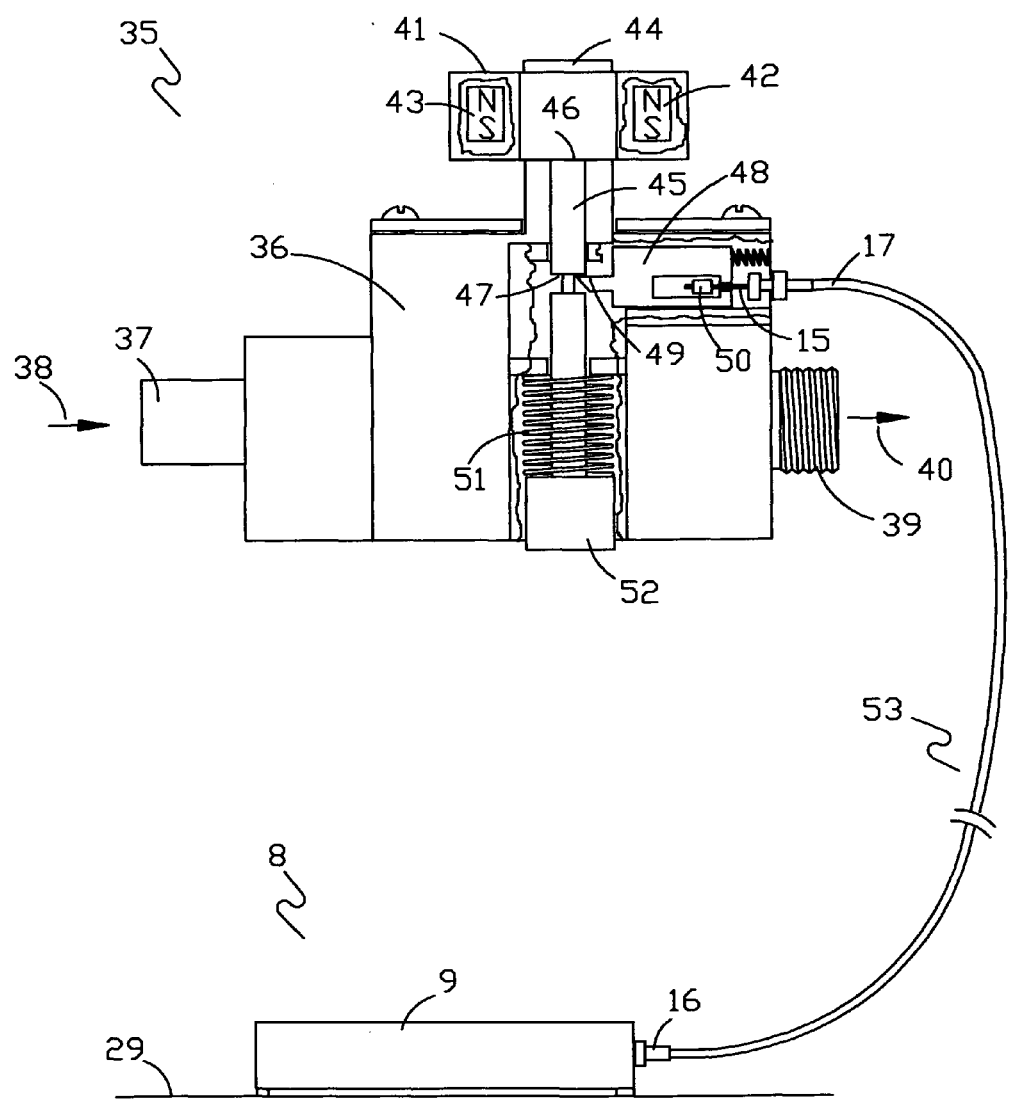
FIG. 7 shows the water sensor assembly of the present invention connected to a shutoff valve via an interconnecting cable.

FIG. 7 shows the water sensor assembly, generally indicated 8, attached to a water valve assembly, generally indicated 35, via interconnecting cable assembly, generally indicated 53, which houses internal cable 15 and its tubular encasement 17 as described and shown in FIG. 1.

The water valve assembly 35 is shown as an example of how the water sensor assembly 8 interacts with a water shutoff valve 36. The water valve assembly 35 has a main shutoff valve body 36 with a water inlet port 37 and the water flow direction indicated by arrow 38. Likewise there is an output port 39 with a water flow direction indicated by arrow 40.

The water valve configuration show in FIG. 7 is based on a modified version of the shutoff valve described in my previous Franklin patent U.S. Pat. No. 7,082,959. As shown in that patent, magnet holder 41 contains two magnets 42 and 43 that are used to control the position of an internal magnet (not shown) that is housed within column 44. The internal magnet functions to open and close a pilot aperture that determines whether the valve is open or closed to fluid flow. Magnet holder 41 slides up and down on column 44, and in its shown position allows the internal magnet, contained within column 44, to open the shutoff valve 36 to fluid flow. Magnet holder 41 is fastened to a reset shaft 45 at location 46. Reset shaft 45 is spring loaded in a downward direction by reset spring 51. Reset button 52 is threaded onto the lower end of the reset shaft 45. Slide latch 48 has a latch point 49 that is shown inserted into recessed area 47 of reset shaft 45. This restricts the downward movement of reset shaft 45.

When the water sensor assembly 8 is exposed to water, and its internal activation mechanism is triggered as previously explained, it pulls on the cable 15 of the cable assembly 53. The end of cable 15, located within the shutoff valve 36 and shown attached to the clamp 50, is pulled in a rightward direction thereby causing slide latch 48 to move rightward and disengages latch point 49 from the recessed area 47 of the reset shaft 45. Reset spring 51 now forces the reset shaft 45 and hence the magnet holder 41 in a downward direction. This movement causes the previously described internal magnet to move in a manner to close the internal pilot valve aperture and causes the valve 36 to close itself to fluid flow.

As previously described, once the water sensor assembly 8 is exposed to water and the water shutoff valve 36 is activated via interconnecting cable assembly, generally indicated 53, there is a need to restore the system to a normal condition. Once the source of the water leak has been repaired, and the wet area dried, the water sensor assembly 8 would be replaced by attaching a new assembly 9 at the end of the cable assembly 53. The water shutoff valve 36 must also now be reset to restore water flow. This is accomplished by moving the reset button 52 in an upward direction, allowing the slide latch 48 and latch point 49, to return to their locking position. The magnet holder 41, being restored to its upward position, will cause the internal pilot valve aperture to open, thereby restoring water flow through the valve.

In summary, the foregoing disclosure describes a novel water sensing assembly that when exposed to a fluid, such as wafer, causes the tensile strength of the paper element to decrease to the point where the layer or layers of paper separate and unravel. The separation and unraveling of the paper element occurs as a result of the lateral force exerted on the paper holders, and hence the paper element, by a wedge shaped structure whose source of axial motion is provided by one or more springs normally held in compression. Other possible configurations could allow the source of axial motion to be produced by a spring or springs in tension. The axial motion of the aforementioned wedge shaped structure also provides the force necessary to activate an associated water shutoff valve via a cable arrangement. The incorporated wedge shaped structure reduces the force exerted on the paper element to a level that allows the paper to tolerate a high humidity environment without disintegrating. This reduced tension is accomplished without reducing the primary spring tension required to activate the associated water shutoff valve.

Another feature of this invention is that it provides an inexpensive means of activating a water shutoff valve without the use of electrical power. It should be understood that anyone skilled in the art might use a switching means to detect when the water valve has been shut off to activate an audible and/or visual alarm. The description of this invention is illustrative and not limiting; further modifications will be apparent to one skilled in the art, in the light of this disclosure and the appended claims.

What is claimed is:

1. A water sensor with an activation mechanism comprising;
   a housing containing a water sensing means and spring loading means functioning in association with an activation means to initiate the shutoff of an external valve when water is sensed by said water sensing means;
   a paper water absorbent material acting as said water sensing means that is placed under a tension force and disintegrates upon contact with water;
   a pair of sensor holders designed to act as mounting elements for said water sensing means with both ends of said sensor holders containing wedge shaped surfaces that when subjected to an external force will cause said sensor holders to be forced apart by virtue of their contact with secondary wedge shaped surfaces;
   a force bar containing a wedge shaped end with wedge angles that are complementary with said wedge shaped surfaces of said sensor holders thereby allowing said wedge shaped end of said force bar to mate with said wedge shaped surfaces of said sensor holders;
   at least one spring designed to exert said external force upon said force bar; and
   a segment of said force bar containing an insert pocket housing a cable and an attached terminating clamp whose purpose is to act as a means of activating an associated water shutoff valve when said water sensor detects the presence of water.

2. The water sensor of claim 1 in which the level of said tension force exerted on said sensor holders and therefore on said water sensing means is determined by the value of said wedge angles of both said sensor holders and said force bar.

3. A water sensor of claim 1 having an indicating means to denote that said water sensor is in a standby condition.

4. A water sensor of claim 1 having an indicating means to denote that said water sensor has been activated.

5. A water sensor of claim 1 wherein the overall wedge angle of said wedge shaped surfaces is about one hundred twenty degrees.

6. A water sensor of claim 1 wherein each sensor holder has at least one horizontal guide area and at least one vertical guide area.

7. The water sensor of claim 6 wherein said water sensing means is wrapped in said horizontal and vertical guide areas and around said sensor holders to hold them together.

8. The water sensor of claim 1 which can operate in a high humidity environment.

* * * * *